(12) United States Patent
Kuo (10) Patent No.: US 9,727,801 B2
(45) Date of Patent: Aug. 8, 2017

(54) ELECTRONIC DEVICE AND METHOD FOR ROTATING PHOTOS

(71) Applicant: FIH (HONG KONG) LIMITED, Kowloon (HK)

(72) Inventor: San-Hsin Kuo, New Taipei (TW)

(73) Assignee: FIH (HONG KONG) LIMITED, Kowloon (HK)

( * ) Notice: Subject to any disclaimer, the term of this patent is extended or adjusted under 35 U.S.C. 154(b) by 63 days.

(21) Appl. No.: 14/729,762

(22) Filed: Jun. 3, 2015

(65) Prior Publication Data

US 2016/0188632 A1    Jun. 30, 2016

(30) Foreign Application Priority Data

Dec. 30, 2014 (TW) .............................. 103146311 A (51) Int. Cl.
*G06K 9/46* (2006.01)
*G06K 9/52* (2006.01)
(Continued)

(52) U.S. Cl.
CPC ........... *G06K 9/52* (2013.01); *G06K 9/00221* (2013.01); *G06K 9/00268* (2013.01); *G06K 9/22* (2013.01);
(Continued)

(58) Field of Classification Search
CPC ......... H04N 21/4223; H04N 21/47205; H04N 21/4316; H04N 5/23219; H04N 5/23212; H04N 5/2628; H04N 5/2352; H04N 1/3871; H04N 2101/00; H04N 19/17; H04N 2201/3247; H04N 5/23216; H04N 5/23222; G06K 9/52; G06K 9/00228; G06K 9/00221; G06K 2009/00322; G06K 9/00201; G06K 9/00261; G06K 9/00281; G06K 9/00315; G06K 9/00664; G06K 9/3208; G06K 9/3241; G06K 9/00248; G06K 9/00302; G06K 9/627; G06K 9/00268; G06K 9/0063; G06K 9/6267; G06K 9/00577; G06K 9/00597; G06T 13/80; G06T 2207/30201; G06T 2207/10016; G06T 7/0042; G06T 17/10; G06T 19/20; G06T 3/60; G06T 7/007; G06T 2219/2016; G06T 7/0075; G06T 1/00; G06T 1/0007; G06F 17/30; G06F 17/30247; G06F 3/013; G06F 3/0487; G06F 3/017; G06F 3/041; G06F 3/04845;
(Continued)

(56) References Cited

U.S. PATENT DOCUMENTS

5,835,616 A * 11/1998 Lobo .................. G06K 9/00221
    382/115
5,933,527 A * 8/1999 Ishikawa ............ G06K 9/00268
    382/118
(Continued)

*Primary Examiner* — Vu Le
*Assistant Examiner* — Aklilu Woldemariam
(74) *Attorney, Agent, or Firm* — Steven Reiss (57) ABSTRACT

In a method for rotating photos, an orientation flag value of a photo is obtained when the photo is viewed by a user of the electronic device. A rotational value of the photo is determined according to the obtained orientation flag value. The photo is rotated according to the determined rotational value when the photo is displayed on a display screen of the electronic device.

12 Claims, 6 Drawing Sheets

(51) Int. Cl.
*G06T 3/60* (2006.01)
*G06K 9/00* (2006.01)
*G06K 9/22* (2006.01)
*G06K 9/32* (2006.01)

(52) U.S. Cl.
CPC ............. *G06K 9/3208* (2013.01); *G06K 9/46* (2013.01); *G06T 3/60* (2013.01)

(58) Field of Classification Search
CPC .......... G06F 17/30793; B42D 2035/06; B42D 25/305; G07C 2209/41; G07C 9/00079; A61B 1/0005; A61B 5/065; G02B 27/0179; G02B 2027/0138; G09G 2380/16; G09G 5/14; H04M 1/0264; G11B 27/323
USPC .................. 382/103, 118, 203, 224, 289, 303
See application file for complete search history.

(56) References Cited

U.S. PATENT DOCUMENTS

| | | | | |
|---|---|---|---|---|
| 5,975,703 A * | 11/1999 | Holman | ............. | G03B 21/2073 349/9 |
| 6,463,426 B1 * | 10/2002 | Lipson | ............. | G06F 17/30247 |
| 9,298,974 B1 * | 3/2016 | Kuo | .................. | H04N 13/0239 |
| 9,516,217 B2 * | 12/2016 | Corcoran | ........... | G06K 9/00228 |
| 2003/0051255 A1 * | 3/2003 | Bulman | .................. | G06Q 30/00 725/135 |
| 2005/0273470 A1 * | 12/2005 | Heigold | ............... | H04N 1/3871 |
| 2006/0115157 A1 * | 6/2006 | Mori | .................. | G06K 9/00221 382/190 |
| 2006/0204054 A1 * | 9/2006 | Steinberg | ............... | H04N 5/232 382/118 |
| 2006/0204055 A1 * | 9/2006 | Steinberg | ............ | H04N 5/23212 382/118 |
| 2008/0013799 A1 * | 1/2008 | Steinberg | ........... | G06K 9/00228 382/118 |
| 2008/0152199 A1 * | 6/2008 | Oijer | .................. | G06K 9/00228 382/118 |
| 2008/0199056 A1 * | 8/2008 | Tokuse | ............... | G06K 9/00295 382/118 |
| 2009/0028453 A1 * | 1/2009 | Collomosse | ....... | H04N 1/00307 382/243 |
| 2009/0129636 A1 * | 5/2009 | Mei | ..................... | G06K 9/00228 382/118 |
| 2009/0220159 A1 * | 9/2009 | Tanaka | ............... | G06K 9/00248 382/203 |
| 2010/0053368 A1 * | 3/2010 | Nanu | ................. | G06K 9/00248 348/224.1 |
| 2010/0054533 A1 * | 3/2010 | Steinberg | ........... | H04N 5/23212 382/103 |
| 2010/0220933 A1 * | 9/2010 | Takano | ................ | A45D 44/005 382/224 |
| 2011/0304611 A1 * | 12/2011 | Suzuki | .................. | G06T 19/006 345/419 |
| 2012/0219180 A1 * | 8/2012 | Mehra | ..................... | G06F 3/013 382/103 |
| 2014/0043329 A1 * | 2/2014 | Wang | ..................... | G06T 17/20 345/420 |
| 2014/0071308 A1 * | 3/2014 | Cieplinski | ................ | G06T 3/60 348/222.1 |
| 2015/0085076 A1 * | 3/2015 | Lockhart | ............ | H04N 13/0468 348/46 |
| 2015/0298705 A1 * | 10/2015 | Kiyama | ................... | B60W 40/09 702/94 |
| 2015/0346991 A1 * | 12/2015 | Kwak | ................... | G06F 3/0416 715/765 |

* cited by examiner

| | |
|---|---|
| Make | Canon |
| Model | Canon EOS-1Ds Mark III |
| Orientation flag | 1 |
| X-Resolution | 300 |
| Y-Resolution | 300 |
| Resolution Unit | dpi |
| Software | Adobe Photoshop CS Macintosh |
| Exposure Time | 0.00800 (1/125) sec |
| FNumber | F2.2 |
| Color Space | sRGB |
| ISO | 100 |
| Exif Version | Exif version 2.1 |
| Date and Time | 2005:09:25 15:00:18 |

FIG. 4

| | | | | |
|---|---|---|---|---|
| Camera Shutter and Preview Image |  |  |  |  |
| Photo |  |  |  |  |
| Rotated Photo |  |  |  |  |
| Orientation Flag | One | Six | Three | eight |
| | FIG. 5A | FIG. 5B | FIG. 5C | FIG. 5D |

FIG. 6

ELECTRONIC DEVICE AND METHOD FOR ROTATING PHOTOS

CROSS-REFERENCE TO RELATED APPLICATIONS

This application claims priority to Taiwanese Patent Application No. 103146311 filed on Dec. 30, 2014, the contents of which are incorporated by reference herein.

FIELD

The subject matter herein generally relates to electronic devices, and particularly to an electronic device capable of automatically rotating photos.

BACKGROUND

Some people often share photos with their friends on social network sites. However, sometimes, the photos are upside down or inverted when displayed on the social network.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "module" refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series and the like.

Figure 1:
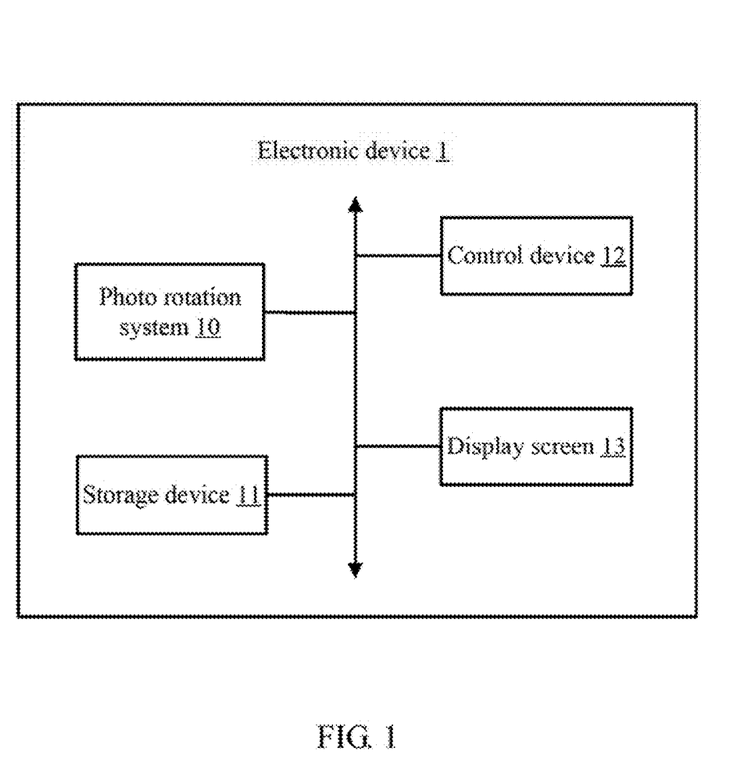
FIG. 1 is a block diagram of an example embodiment of an electronic device including a photo rotation system.

FIG. 1 is a block diagram of an example embodiment of an electronic device. In at least one embodiment, the electronic device 1 can be a portable electronic device, such as a smart phone, a tablet computer, a personal digital assistant, an E-book, or the like. The electronic device 1 can include, but is not limited to, a storage device 11, at least one control device 12, and a display screen 13. In at least one embodiment, the electronic device 1 can further include a photo rotation system 10. FIG. 1 illustrates only one example of the electronic device that can include more or fewer components than illustrated, or have a different configuration of the various components in other embodiments.

The storage device 11 can include various types of non-transitory computer-readable storage media. For example, the storage device 11 can be an internal storage system, such as a flash memory, a random access memory (RAM) for temporary storage of information, and/or a read-only memory (ROM) for permanent storage of information. The storage device 11 can also be an external storage system, such as a hard disk, a storage card, or a data storage medium. In one embodiment, an image manipulation program can be stored in the storage device 11. The image manipulation program includes, but is not limited to, ACDSee, IfranView, and the like. In another embodiment, the storage device 11 can store an open source computer vision (OpenCV). The OpenCV can be a library of programming functions mainly aimed at real-time computer vision and include a face database storing a number of face images. It can be a prior art and focus mainly on real-time image processing. The at least one control device 12 can be a central processing unit (CPU), a digital signal processor, a single chip, an application-specific integrated circuit (ASIC), or a field programmable gate array (FPGA), for example. The display screen 13 can be a liquid crystal display (LCD), an organic light-emitting diode (OLED) display, or the like.

In at least one embodiment, the electronic device 1 can include a window coordinate system which rotates together with the rotation of the display screen 13 of the electronic device 1. When the display screen 13 is in a natural state, the origin of the window coordinate system can be a top left corner of the display screen 13, the X axis of the window coordinate system can be the rightward direction from the origin, and the Y axis of the window coordinate system can be the downward direction from the origin.

Figure 2:
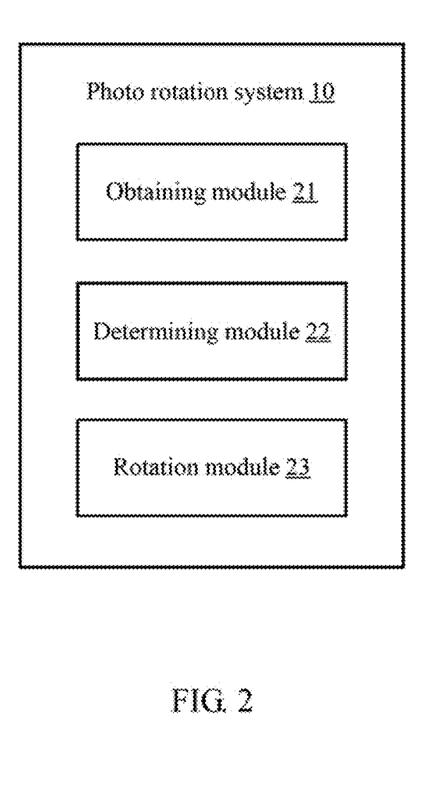
FIG. 2 is a block diagram of an example embodiment of function modules of the photo rotation system in FIG. 1.

FIG. 2 is a block diagram of an example embodiment of function modules of the photo rotation system 10. In the embodiment, the photo rotation system 10 can include an obtaining module 21, a determining module 22, and a rotation module 23. The function modules 21-23 can include computerized code in the form of one or more programs, which are stored in the storage device 11 and can be executed by the at least one control device 12 to provide functions of the function modules 21-23.

The obtaining module 21 obtains an orientation flag value of a photo when the photo is viewed by a user of the electronic device 1. In at least one embodiment, the orientation flag value of the photo can include one, six, three, and eight, for example.

Figure 4:
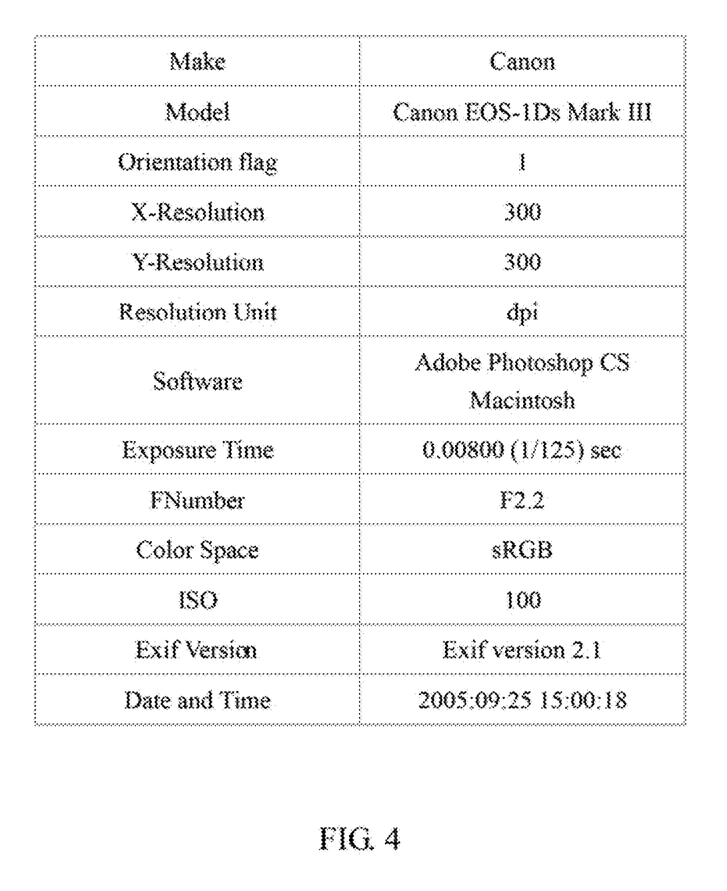
FIG. 4 is a diagrammatic view of an example embodiment of EXIF information of a photo.
Figure 5A:
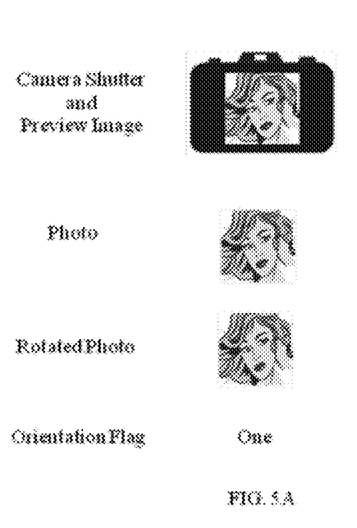
FIG. 5A-FIG. 5D is a diagrammatic view showing how to rotate a photo.
Figure 5B:
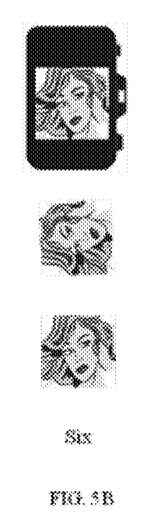
Figure 5C:
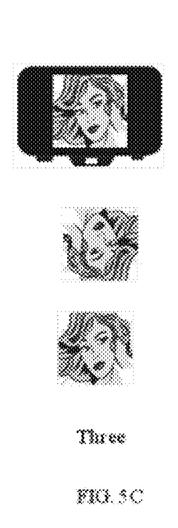
Figure 5D:
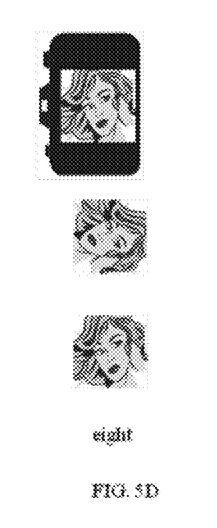

In one embodiment, the obtaining module 21 can activate the image manipulation program (e.g., ACDSee or IfranView) to obtain the orientation flag value of the photo. First, the image manipulation program can be activated to identify exchangeable image file (EXIF) information of the photo which is embedded within the photo file itself when the photo is taken. As shown in FIG. 4, the EXIF information of the photo can include varies photographic parameters such as image description, resolution unit, orientation flag value, date time, camera model, and the like. When the image manipulation program identifies the EXIF information of the photo, the orientation flag value of the photo can be obtained by the obtaining module 21 from the identified EXIF information.

Figure 6:
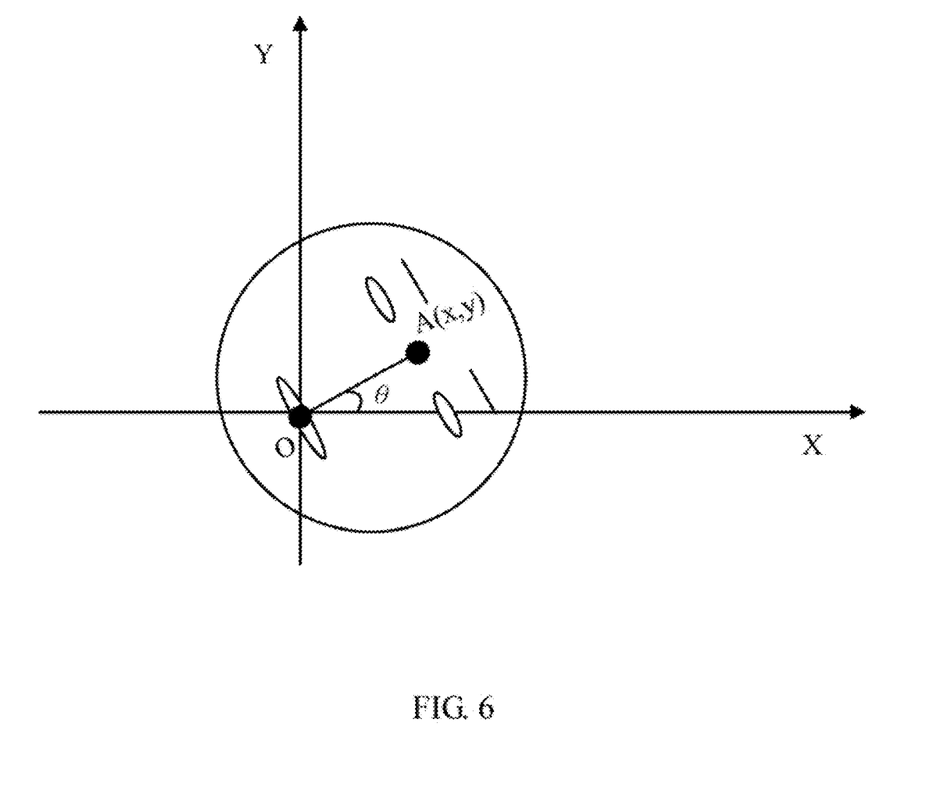
FIG. 6 is a diagrammatic view showing how to determine an orientation flag value by employing an open source computer vision.

In another one embodiment, the obtaining module 21 can determine the orientation flag value of the photo by employing the OpenCV. First, the obtaining module 21 can employ the OpenCV to identify one or more facial images from the photo, and select one of the one or more facial images as a primary facial image. In detail, if the number of facial images is one, the facial image uniquely appearing in the photo is selected as the primary facial image. If the number of facial images is more than one, the facial image which is most similar to face images in the face database of the OpenCV is selected as the primary facial image. Second, the obtaining module 21 can establish a virtual coordinate system in the primary facial image (see in FIG. 6): where an origin of the virtual coordinate system is a center of the mouth of the primary facial image; the X axis of the virtual coordinate system is parallel with and in a same direction as the X axis of the window coordinate system; and the Y axis of the virtual coordinate system is parallel with and in an opposite direction as the Y axis of the window coordinate system. Third, as shown in FIG. 6, the determining module 21 can map the position between two eyes of the primary facial image into the virtual coordinate system to be a target point, form a substantially straight line between the target point and the origin, and determine an angle value between the straight line and the horizontal axis of the virtual coordinate system according to the following formulas:

$$\theta = A\tan 2(x,y) * 180/\pi;$$

where θ is an angle value between the straight line and the X axis of the virtual coordinate system; (x, y) is a set of coordinates of the target point; π is a ratio of the circumference of a circle to its diameter; and $$A\tan 2(x, y) = \begin{cases} \arctan(x/y); & y > 0 \\ \arctan(x/y) + \pi; & x \geq 0, y < 0 \\ \arctan(x/y) - \pi; & x < 0, y < 0 \\ +\pi/2; & x > 0, y = 0 \\ -\pi/2; & x < 0, y = 0 \\ \text{undefined} & x = 0, y = 0 \end{cases}$$

Fourth, the determining module 21 can determine the orientation flag value of the photo according to the angle value between the straight line and the X axis of the virtual coordinate system. In detail, when the angle value between the straight line and the X axis of the virtual coordinate system falls into a half open interval [45°, 135°), the orientation flag value of the photo is determined as one. When the angle value between the straight line and the X axis of the virtual coordinate system falls into a half open interval [135°, 225°), the orientation flag value of the photo is determined as six. When the angle value between the straight line and the X axis of the virtual coordinate system falls into a half open interval [225°, 315°), the orientation flag value of the photo is determined as three. When the angle value between the straight line and the X axis of the virtual coordinate system falls into a half open interval [0°, 45°) or [315°, 360°), the orientation flag value of the photo is determined as eight.

The determining module 22 determines a rotation value of the photo according to the obtained orientation flag value. In at least one embodiment, an orientation flag value of the photo represents a kind of relative position of a camera shutter and a preview image of the photo when the photo is taken. As shown in FIG. 5A-FIG. 5D, when the orientation flag value of the photo is one, the camera shutter is parallel with and in a same direction as the preview image of the photo (see in FIG. 5A). When the orientation flag value of the photo is six, the camera shutter is perpendicular with and in a right direction to the preview image of the photo (see in FIG. 5B). When the orientation flag value of the photo is three, the camera shutter is parallel with and in an opposite direction with the preview image of the photo (see in FIG. 5C). When the orientation flag value of the photo is eight, the camera shutter is perpendicular with and in a left direction with the preview image of the photo (see in FIG. 5D). Thus, according to the obtained orientation flag value of the photo, the determining module 22 can determine the relative position of the camera shutter and the photo which is generated according to the preview image, and further determine the rotational value of the photo. In detail, when the obtained orientation flag of the photo is one, the determining module 22 determines that the rotational value of the photo is 0 degrees, when the obtained orientation flag of the photo is six, the determining module 22 determines that the rotational value of the photo is 90 degrees, when the obtained orientation flag of the photo is three, the determining module 22 determines that the rotational value of the photo is 180 degrees, and when the obtained orientation flag of the photo is eight, the determining module 22 determines that the rotational value of the photo is 270 degrees (see in FIG. 5A-FIG. 5D).

The rotation module 23 rotates the photo according to the determined rotational value of the photo when the photo is displayed on the display screen 13. In detail, if the rotational value of the photo is 0 degrees, the rotation module 23 can prevent a rotation of the photo when displayed on the display screen 13, if the rotational value of the photo is 90 degrees, the rotation module 23 can rotate the photo 90 degrees clockwise when displayed on the display screen 13, if the rotational value of the photo is 180 degrees, the rotation module 23 can rotate the photo 180 degrees clockwise when displayed on the display screen 13, and if the rotational value of the photo is 270 degrees, the rotation module 23 can rotate the photo 270 degrees clockwise when displayed on the display screen 13 (see in FIG. 5A-FIG. 5D).

Figure 3:
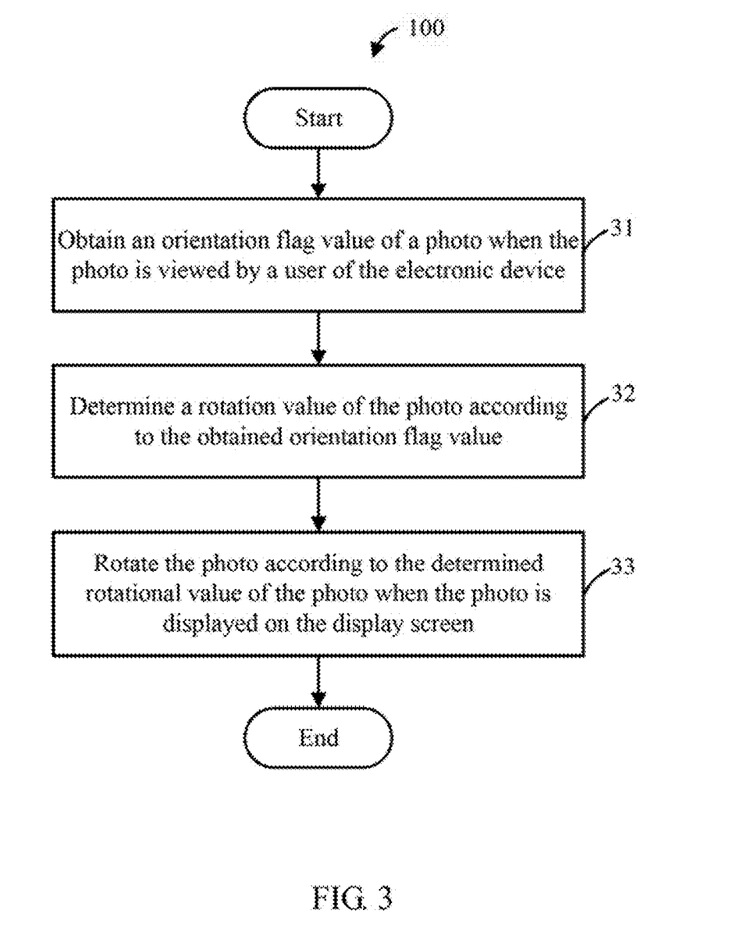
FIG. 3 is a flowchart of an example embodiment of a method for rotating photos.

FIG. 3 is a flowchart of an example embodiment of a method 100 for rotating photos in an electronic device 1. In at least one embodiment, the method 100 is provided by way of example, as there are a variety of ways to carry out the method. The method 100 described below can be carried out using the configurations illustrated in FIGS. 1-2, for example, and various elements of these figures are referenced in explaining example method. Each block shown in FIG. 3 represents one or more processes, methods, or subroutines, carried out in the exemplary method. Furthermore, the illustrated order of blocks is by example only and the order of the blocks can be changed. The exemplary method can begin at block 31. Depending on the embodiment, additional blocks can be added, others removed, and the ordering of the blocks can be changed.

At block 31, an obtaining module obtains an orientation flag value of a photo when the photo is viewed by a user of the electronic device. In at least one embodiment, an image manipulation program (e.g., ACDSee or IfranView) or an open source computer vision (OpenCV) can be activated to obtain the orientation flag value of the photo. The orientation flag value of the photo includes one, six, three, and eight.

At block 32, a determining module determines a rotation value of the photo according to the obtained orientation flag value. In at least one embodiment, when the obtained orientation flag of the photo is one, the determining module determines that the rotational value of the photo is 0 degrees, when the obtained orientation flag of the photo is six, the determining module determines that the rotational value of the photo is 90 degrees, when the obtained orientation flag of the photo is three, the determining module determines that the rotational value of the photo is 180 degrees, and when the obtained orientation flag of the photo is eight, the determining module determines that the rotational value of the photo is 270 degrees.

At block 33, a rotation module rotates the photo according to the determined rotational value of the photo when the photo is displayed on the display screen. In detail, if the rotational value of the photo is 0 degrees, the rotation module can prevent a rotation of the photo when displayed on the display screen, if the rotational value of the photo is 90 degrees, the rotation module can rotate the photo 90 degrees clockwise when displayed on the display screen, if the rotational value of the photo is 180 degrees, the rotation module can rotate the photo 180 degrees clockwise when displayed on the display screen, and if the rotational value of the photo is 270 degrees, the rotation module can rotate the photo 270 degrees clockwise when displayed on the display screen.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A computer-implemented method for rotating photos comprising:
   receiving, at a processor of an electronic device, data related to a photographic image;
   obtaining, at the processor, an orientation flag value of the photographic image;
   determining, based on an orientation of the electronic device and the obtained orientation flag value, a rotational value of the photographic image; and
   rotating the photographic image according to the determined rotational value when the photographic image is displayed on a display screen of the electronic device;
   wherein step of obtaining the orientation flag value of the photographic image comprises:
   identifying one or more facial images in the photographic image;
   selecting a primary facial image from the identified one or more facial images;
   establishing a virtual coordinate system in the selected primary facial image;
   mapping a position between two eyes of the primary facial image into the virtual coordinate system to be a target point;
   forming a straight line between the target point and an origin of the virtual coordinate system, wherein the original of the virtual coordinate system is a center of the mouth of the primary facial image, an X axis of the virtual coordinate system is parallel with and in a same direction as the X axis of a window coordinate system, and a Y axis of the virtual coordinate system is parallel with and in an opposite direction as the Y axis of the window coordinate system;
   determining an angle value between the straight line and a horizontal axis of the virtual coordinate system; and
   determining the orientation flag value of the photographic image according to the angle value between the straight line and the X axis of the virtual coordinate system.

2. The method according to claim 1, wherein the orientation flag value of the photographic image comprises one, six, three, and eight.

3. The method according to claim 2, wherein the rotational value of the photographic image is determined as 0 degrees when the orientation flag of the photographic image is one; the rotational value of the photographic image is determined as 90 degrees when the orientation flag of the photographic image is six; the rotational value of the photographic image is determined as 180 degrees when the orientation flag of the photographic image is three; and the rotational value of the photographic image is determined as 270 degrees when the orientation flag of the photographic image is eight.

4. The method according to claim 3, wherein a rotation of the photographic image is prevented when the rotational value of the photographic image is 0 degrees, the photographic image is rotated 90 degrees clockwise when rotational value of the photographic image is 90 degrees, the photographic image is rotated 180 degrees clockwise when rotational value of the photographic image is 180 degrees, and the photographic image is rotated 270 degrees clockwise when rotational value of the photographic image is 270 degrees.

5. An electronic device, comprising:
   a display screen;
   at least one control device; and
   a storage device that stores one or more programs, when executed by the at least one control device, cause the at least one control device to performing operations comprising:
   obtaining an orientation flag value of a photo;
   determining a rotational value of the photo according to the obtained orientation flag value; and
   rotating the photo according to the determined rotational value when the photo is displayed on a display screen of the electronic device;
   wherein obtaining the orientation flag value of the photo further comprises:
   identifying one or more facial images in the photo;
   selecting a primary facial image from the identified one or more facial images;
   establishing a virtual coordinate system in the selected primary facial image;

mapping a position between two eyes of the primary facial image into the virtual coordinate system to be a target point;

forming a straight line between the target point and an origin of the virtual coordinate system, wherein the origin of the virtual coordinate system is a center of the mouth of the primary facial image, an X axis of the virtual coordinate system is parallel with and in a same direction as the X axis of a window coordinate system, and a Y axis of the virtual coordinate system is parallel with and in an opposite direction as the Y axis of the window coordinate system;

determining an angle value between the straight line and a horizontal axis of the virtual coordinate system; and determining the orientation flag value of the photo according to the angle value between the straight line and the X axis of the virtual coordinate system.

6. The electronic device according to claim 5, wherein the orientation flag value of the photo comprises one, six, three, and eight.

7. The electronic device according to claim 6, wherein the rotational value of the photo is determined as 0 degrees when the orientation flag of the photo is one; the rotational value of the photo is determined as 90 degrees when the orientation flag of the photo is six; the rotational value of the photo is determined as 180 degrees when the orientation flag of the photo is three; and the rotational value of the photo is determined as 270 degrees when the orientation flag of the photo is eight.

8. The electronic device according to claim 7, wherein a rotation of the photo is prevented when the rotational value of the photo is 0 degrees, the photo is rotated 90 degrees clockwise when rotational value of the photo is 90 degrees, the photo is rotated 180 degrees clockwise when rotational value of the photo is 180 degrees, and the photo is rotated 270 degrees clockwise when rotational value of the photo is 270 degrees.

9. A non-transitory storage medium having stored thereon instructions that, when executed by at least one control device of an electronic device, causes the at least one control device to perform a method for rotating photos, the method comprising:

receiving, at a processor of an electronic device, data related to a photographic image;

obtaining, at the processor, an orientation flag value of the photographic image;

determining, based on an orientation of the electronic device and the obtained orientation flag value, a rotational value of the photographic image; and rotating the photographic image according to the determined rotational value when the photographic image is displayed on a display screen of the electronic device;

wherein obtaining the orientation flag value of the photographic image further comprises:

identifying one or more facial images in the photographic image;

selecting a primary facial image from the identified one or more facial images;

establishing a virtual coordinate system in the selected primary facial image;

mapping a position between two eyes of the primary facial image into the virtual coordinate system to be a target point;

forming a straight line between the target point and an origin of the virtual coordinate system, wherein the origin of the virtual coordinate system is a center of the mouth of the primary facial image, an X axis of the virtual coordinate system is parallel with and in a same direction as the X axis of a window coordinate system, and a Y axis of the virtual coordinate system is parallel with and in an opposite direction as the Y axis of the window coordinate system;

determining an angle value between the straight line and a horizontal axis of the virtual coordinate system; and determining the orientation flag value of the photographic image according to the angle value between the straight line and the X axis of the virtual coordinate system.

10. The non-transitory storage medium according to claim 9, wherein the orientation flag value of the photographic image comprises one, six, three, and eight.

11. The non-transitory storage medium according to claim 10, wherein the rotational value of the photographic image is determined as 0 degrees when the orientation flag of the photographic image is one; the rotational value of the photographic image is determined as 90 degrees when the orientation flag of the photographic image is six; the rotational value of the photographic image is determined as 180 degrees when the orientation flag of the photographic image is three; and the rotational value of the photographic image is determined as 270 degrees when the orientation flag of the photographic image is eight.

12. The non-transitory storage medium according to claim 11, wherein a rotation of the photographic image is prevented when the rotational value of the photographic image is 0 degrees, the photographic image is rotated 90 degrees clockwise when rotational value of the photographic image is 90 degrees, the photographic image is rotated 180 degrees clockwise when rotational value of the photographic image is 180 degrees, and the photographic image is rotated 270 degrees clockwise when rotational value of the photographic image is 270 degrees.

* * * * *